Aug. 18, 1964     J. D. GYLFE     3,145,150
FUEL-MODERATOR ELEMENT FOR A NUCLEAR REACTOR AND METHOD OF MAKING
Filed Jan. 4, 1960

*INVENTOR.*
JAMES D. GYLFE
BY
*A. Fredrick Hamann*
ATTORNEY 3,145,150
FUEL-MODERATOR ELEMENT FOR A NUCLEAR
REACTOR AND METHOD OF MAKING
James D. Gylfe, Woodland Hills, Calif., assignor to
North American Aviation, Inc.
Filed Jan. 4, 1960, Ser. No. 326
4 Claims. (Cl. 176—71)

The present invention is directed to nuclear reactor fuel elements and more particularly to a combination fuel-moderator element for a nuclear reactor.

In nuclear reactors which would incorporate integral or separate nuclear superheat cores of the high temperature, steam-cooled type, the neutron economy suffers because corrosion considerations make mandatory the use of stainless steel in relatively large quantities for fuel element cladding material. To contain fission product gas pressure, the tube wall must be from 20 to 30 mils thick in typical pressurized water reactor designs, and this thickness would have to be increased in a steam-superheat reactor of this type because of the reduction in material strength at the higher design temperatures and pressures.

Another problem encountered in steam-cooled cores is that of localized flux and power depressions resulting from the necessity to cluster the fuel elements into discrete bundles which are then set in channels distributed through the moderator. This disadvantage factor is aggravated when the fuel is clad with material of high neutron cross section.

The present invention is directed to the solution of the above mentioned problems by providing a fuel element with an integral moderator and a substantial reduction in neutron absorbing materials.

It is, therefore, the general object of the present invention to provide a new and improved fuel element for use in nuclear reactors.

It is a further object of the present invention to provide a fuel-moderator element for a nuclear reactor and a method of making such element.

It is another object of the present invention to provide a fuel-moderator element for a nuclear reactor in which the possibility of fission gas release into the reactor system is significantly reduced.

It is another object of the present invention to provide a fuel-moderator element for a nuclear reactor in which the thermal flux disadvantage is significantly reduced because of the high homogenization of moderator and fuel.

It is another object of the present invention to provide a fuel-moderator element in which the hydrogen to uranium atomic ratio is variable over a wide range.

It is another object of the present invention to provide a fuel-moderator element in which the moderating material is a sealed container which confines the fuel and fission gases.

It is still another object of the present invention to provide a fuel-moderator element which will increase the average power density for a specific reactor while requiring less fissionable material.

Figure 1:
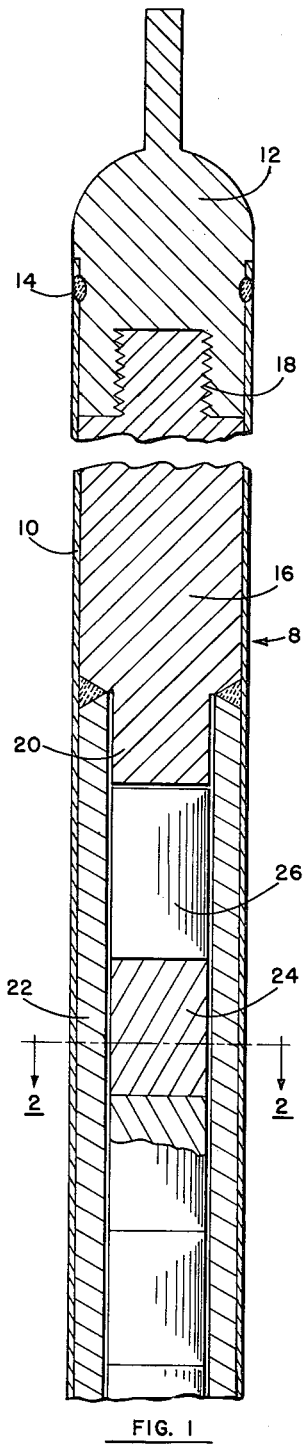
Figure 3:
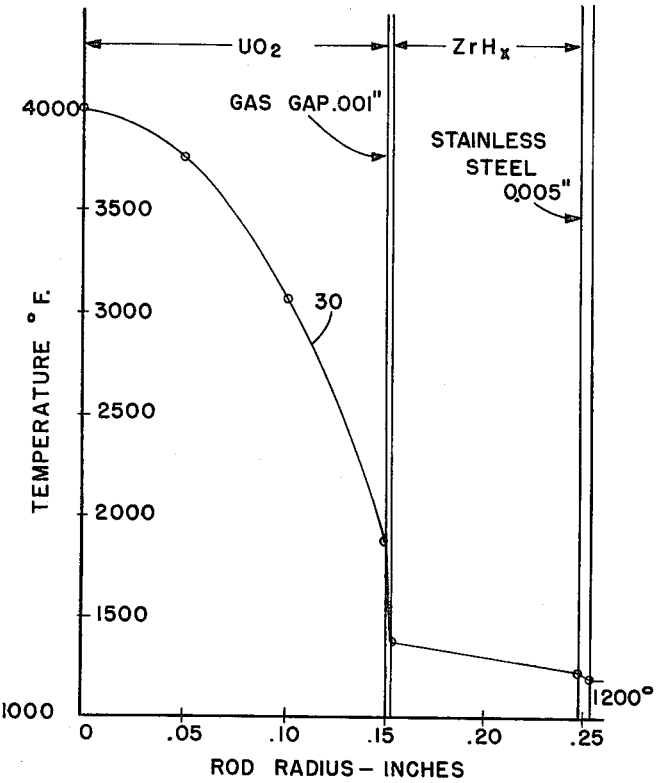
Figure 2:
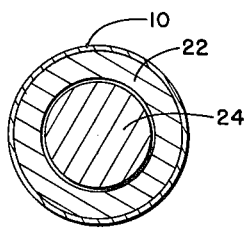

These and other objects of the present invention will be more apparent from the following detailed description and the drawing, hereby made a part of the specification, in which FIGURE 1 is a sectional view of the preferred embodiment of the present invention, FIGURE 2 is a cross-sectional view along lines 2—2 of FIGURE 1, and FIGURE 3 is a graph of the temperature profile through the fuel element of FIGURE 1.

The present invention comprises an integral fuel-moderator element using the moderator as the primary fuel cladding material and consists, in the preferred embodiment, of a tube of zirconium hydride filled with fuel pellets and sealed at both ends. The zirconium hydride is preferably clad or plated with a thin-walled tube suitable as a sealed corrosion and hydrogen diffusion barrier.

Referring now to FIGURE 1, the preferred embodiment of the fuel pin of the present invention, indicated generally at 8, is shown in cross section. The pin consists of an outer tube 10 preferably of stainless steel having an O.D. of about 0.5 inch and a thickness of about 5 mils. The outer tube or cladding 10 has upper and lower identical end caps 12, preferably of stainless steel, welded as at 14 to provide a completely enclosed container in which the fissionable material and moderator are sealed.

Within the pin assembly 8 are identical upper and lower reflector or moderator plugs 16 which are attached to the end caps 12 by threads 18 or similar means and have a reduced diameter portion 20 at the end opposite the attachment 18. The portion 20 fits within a moderator tube 22 which extends the remaining length of the fuel-containing portion of the pin and fits over the reduced diameter portion 20 of the lower reflector plug 16.

Within the moderator tube 22 are one or more fissionable material-containing pellets 24 which are preferably separated from the reduced diameter portion 20 by a thermal insulation plug 26 so that the high temperature central area of the fuel pellets 24 is not adjacent to the reflector plug 16. The stainless steel tube 10 protects the zirconium hydride against corrosion by the coolant and serves as a diffusion barrier. The tube 10 is bonded to the zirconium hydride tube either by pressure bonding techniques or by in situ hydriding after assembly, as is described hereinafter in detail.

The fissionable material-containing pellets comprise any form of fissionable uranium or plutonium such as metal, alloys, or ceramic compositions, and fuel or fissionable material as used herein is intended to have such meaning. Examples of such fuels are uranium or plutonium metal, thorium-uranium alloy, thoria-urania, uranium dioxide, refractory ceramic compositions such as uranium carbide and nitride, and alloys such as uranium-molybdenum. The enrichment of the fissionable isotope may be varied in accordance with the dictates of the reactor design.

The fuel is $UO_2$ in the preferred embodiment, in the form of 0.300 inch diameter pellets one-half inch long. A one mil radial clearance is allowed between the pellets and the moderator tube and the gap is filled with hydrogen, in the preferred embodiment, to provide a thermal bond. The moderator tube 22 has a wall thickness of .094 inch which is sufficient to contain an internal pressure of approximately 4000 p.s.i. Thus, the zirconium hydride moderator is utilized in the preferred embodiment as a structural container having the fuel sealed within it.

The cladding tube 10 may likewise be satisfactorily chosen from a number of metals and alloys, preferably having a relatively low neutron absorption cross section for the energy range of the reactor. Satisfactory examples for a thermal reactor are aluminum and its alloys such as Al-$Al_2O_3$ and stainless steel, e.g., types 310, 410, 431, 440A, or 304; stainless steel being preferred because of the decreased wall thickness required. Other cladding materials which may be used are titanium, tungsten, magnesium and its alloys, and Inconel or other nickel-chromium alloys. Further, the use of diffusion barriers, such as a nickel plating 0.5 mil thick, is contemplated where necessary, e.g., on the interior of the cladding tube or moderator tube.

If the stainless steel is used as a corrosion-resistant, protective cladding, the thickness can be reduced to about 5 mils. At 1200° F. the tensile strength of zirconium hydride is about twice that of 304 stainless steel and the moderator wall thickness is such that its strength is more than adequate to contain internal gas pressure. Thus, replacement of most of the stainless steel of a conventional fuel element by zirconium hydride in the present invention substantially reduces the parasitic absorption in the fuel element. In this manner, the fuel is doubly sealed from the outside environment, i.e., coolant, by the sealed moderator container and the sealed cladding container.

The probability of releasing fission products into the coolant stream is significantly smaller compared to prior art fuel element designs because the containment wall is relatively thick in terms of pressure containment but thin in terms of neutron absorption.

The moderator and reflector material contemplated in the pin 8 for the preferred embodiment of the present invention is zirconium hydride. The volume around the pellets 24 within the tube 22 may be filled with a heat transfer medium such as Pb, Pb-Bi alloy, Na, NaK alloy, or a gas such as helium or hydrogen, preferably the latter.

Moderator and reflector as used herein are defined to include graphite, beryllium, beryllium oxide, and hydrides of metals, metal alloys or compounds having a thermal neutron cross section of less than 10 barns, such metals include Li-7, Na, K, Ca, Rb, Sr, Ba, Ti, V, Y, Zr, Nb, La, Ce, and Ta. Examples of alloys are Ti—69% V, Zr—2.3% Ni, Zr—23% Ta, Zr—1.5% Sn, as well as titanium alloyed with Nb, Mo, Cr, and Zr, and compounds such as $Zr_2Ni$, $ZrV_2$, and $ZrCr_2$, which are hydrided. The term hydride as used herein includes deuterides and tritides. See "Nucleonics," Vol. 14, No. 11, November 1956, pages 146–153, "Solid Metal Hydrides as Reactor Moderators."

Therefore, the moderator and reflector may each be at least one material selected from the class consisting of graphite, beryllium, beryllium oxide, and hydrides of alkali metals, alkaline earth metals and transition metals of subgroups IIIB, IVB, and VB of periods IV, V, and VI of the periodic chart of elements (see "Handbook of Chemistry and Physics," 37th Edition, pages 392, 393, published by the Chemical Rubber Publishing Co., Cleveland, Ohio) where the moderator has a thermal neutron absorption cross section of less than 10 barns.

The moderating effect of zirconium hydride of the preferred embodiment is exemplified by the following table showing the volume ratio required for approximately the same moderating power for representative moderators.

TABLE I

| Material: | Approximate equivalent volume replacement ratio |
| --- | --- |
| Zirconium hydride | 1 |
| Beryllium oxide | 6 |
| Graphite | 18 |

It is apparent from Table I that six times as much beryllium oxide must be placed within the reactor in order to obtain the same moderating power as zirconium hydride. In the case of graphite moderation, 18 times as much material is required than when zirconium hydride is used as the moderating material. The relative ratios for other hydrides mentioned above may be easily determined by skill of the art calculations. See "Principles of Nuclear Reactor Engineering," by Glasstone, pages 147 et seq. (Van Nostrand, 1955). It is within purview of the present invention to use beryllium, beryllium oxide, or graphite as a moderator although an increase in size of the fuel element would result. When graphite is used, a nickel plating may be placed between the graphite and the fuel to prevent diffusion of the fission gases into the graphite.

FIGURE 2 is a cross-sectional view of FIGURE 1, and shows the concentric arrangement of the fuel 24, moderator 22 and cladding 10. The calculated thermal performance of the fuel pin 8 is shown in FIGURE 3, where a plot of the temperature (° F.) as a function of pin or rod radius is shown. The curve 30 indicates that a temperature gradient of about 2100° F. exists between the center and periphery of the fuel pellet with an additional temperature gradient of about 500° F. across the gas gap between the pellet and zirconium hydride. The temperature gradient across the zirconium hydride is less than 200° F. attesting to the good thermal conductivity of zirconium hydride.

The maximum specific power for the conditions indicated is 60.6 kw./kg. u. and the surface heat flux is 202,000 B.t.u./hr. ft.$^2$. Average values of these parameters in a typical reactor would be about one-third of these values. Similarly, the average power density in a steam-cooled core with steam pressure of 1500 p.s.i., a velocity of approximately 100 ft./sec., and an outlet temperature of 1000° F. would be between 40 and 50 kw./liter. These values are comparable to those currently quoted for advanced pressurized water reactors and higher than those obtainable in current boiling water reactors.

One reactor in which the fuel pin of the present invention may be utilized is described in copending application Serial Number 824,874, filed July 3, 1959, by Donald J. Stoker et al. entitled "Steam Superheat Boiling Water Nuclear Reactor," the disclosure of which is incorporated in and made a part hereof. Utilizing the fuel element of the present invention in the reactor of the referenced copending application would not only improve the nuclear characteristics by reducing parasitic neutron absorption and reduce the possibility of fission gas release into the coolant, but also would increase the average power density about 50 percent in the nuclear superheat region of the core with less fissionable material required per element.

The fuel element of the present invention is not limited to use in any particular reactor but is particularly useful in superheat reactors as described in the above referenced application and as known in the art. See U.S. Patents 2,787,593 and 2,806,820. Also see "Proceedings of the International Conference on the Peaceful Uses of Atomic Energy," 1958, Vol. 8, papers by Dolezhal (15/P/2139 and 2183) and "Nucleonics," Vol. 17, No. 2, pages 97–99, February 1959.

The following table gives an example of a fuel pin for use in the above referenced copending application.

TABLE II

*Fuel Pin Parameters*

| | |
| --- | --- |
| Fuel | $UO_2$. |
| Fuel enrichment | About 2 a/o $U^{235}$. |
| Form | Pellets. |
| Pellet length | 0.50 inch. |
| Pellet diameter | 0.300 inch. |
| Number of pellets per pin | 240. |
| Number of pins per assembly | 36. |
| Moderator wall thickness | 0.94 inch. |
| Pin wall thickness (SS) | 0.005 inch. |
| Active length of core | 10 feet. |
| Active core diameter | 9 feet. |
| Fuel assemblies, superheater | 60. |
| Fuel assemblies, total | 256. |

The fuel pin 8 of the preferred embodiment may be assembled in a variety of methods, each method having distinct advantages. In the first method, the lower reflector plug 16 of zirconium hydride, hydrided to a stoichiometric value of 1.65 and ground to size, is welded to the tube 22 to form a seal. The fuel pellets 24 are placed within the tube 22 along with thermal insulators 26. The top reflector plug 16 is then welded, brazed, or otherwise sealed in place. The inner assembly consisting of the tubular moderator 22 and the end plugs, preferably, but not necessarily, of the same material as the tube 22, is then inspected and tested and the joints ground where necessary. The outer tube 10 is then placed over the assembly and subjected to an exterior pressure, e.g., pressure bonding, to force the tube 10 into conformity with tube 22 and plugs 16. This pressure bonding operation may be accomplished by any means well known in the art before the welds 14 are made. The end plugs 12 are inserted and welds 14 are then made to form a sealed joint. In the above method, all moderator and reflector parts are in their final hydride form and are formed to the desired dimensions before assembly starts. This method may also be utilized to fabricate fuel pins using graphite, beryllium, beryllium oxide, or other metal hydrides as the moderating material.

Another method of assembly is as follows. The zirconium hydride tube 22 and reflector plugs 16 are welded together with the fuel pellets 24 and thermal insulators 21 sealed inside. The entire assembly is then inspected and the structural integrity tested. The assembly is then placed within the tube 10. The zirconium hydride in this method initially contains hydrogen to the value of less than one and, therefore, the solid and hydride parts are smaller than required for the final fuel element, and space is present both between the pellets and the moderator, and the moderator and the cladding wall. The assembly is then heated at a high temperature for a number of hours in a pressurized hydrogen atmosphere so that a stoichiometric value of about 1.65 for hydrogen is present. This stoichiometric value is the value for the preferred embodiment. This yields a hydrogen density of about $6 \times 10^{22}$ atoms of H per cm.$^3$ and puts the alloy in the delta phase where phase changes are avoided during thermal cycling. These phase changes are not significant in lower temperature applications, e.g., boiling water reactors of the prior art. During this operation, the moderator and reflector elements grow and a heat transfer bond is obtained in this manner. The end caps are then welded in place, sealing the ends of the fuel pin.

See "Metallurgy of Zirconium," Lustman and Kerze (McGraw-Hill Book Company, Inc.—1955) and "Zirconium," Miller (Butterworth's Scientific Publications—1954) for conditions in hydriding. See also Shannon, "Conditions for Hydriding of Zirconium and Zircalloy 2, an Interpretive Literature Survey," HW–55460, April 7, 1958 (unclassified AEC report). See also the following publications, for example, for hydriding conditions for other materials: AERE–I/M–38, "Zr Deuterides and Tritides" (1955); NYO–3957, "A Survey Report on Lithium Hydride" (1954); BMI–1112 (July 1956); and UCRL–4519 Revised (1957). All are unclassified reports of the AEC.

Although a particular embodiment of the present invention has been described, various modifications will be apparent to those skilled in the art. Therefore, the present invention is not limited to the specific fuel element embodiment disclosed but only by the appended claims.

What is claimed is:

1. A fuel pin for a nuclear reactor comprising a hollow, sealed, pressure container, said container being a hydride of at least one material selected from the class consisting of alkali metals, alkaline earth metals, and transition metals of subgroups III B, IV B, and V B of periods IV, V, and VI having a thermal neutron cross section of less than 10 barns, a fissionable fuel material loosely contained within said sealed pressure container, and a thin corrosion resistant jacket enclosing said pressure container and sealed thereto.

2. A fuel pin for a nuclear reactor comprising a hollow, sealed, pressure container, said container being zirconium hydride, a fissionable fuel material loosely contained within said sealed pressure container, fluid heat exchanging means in said pressure container for transfer of heat from said fuel material to said zirconium hydride, and a thin corrosion resistant jacket enclosing said zirconium hydride container.

3. A fuel pin for a nuclear reactor comprising a hollow sealed pressure container, said container being zirconium hydride in massive form, a fissionable fuel material loosely contained within said sealed pressure container, fluid heat exchanging means in said container for transferring heat from said fuel material to said zirconium hydride, a thin corrosion resistant jacket in heat exchanging relationship with and enclosing said zirconium hydride container.

4. The fuel pin of claim 3 wherein said zirconium hydride is in the delta phase.

References Cited in the file of this patent

UNITED STATES PATENTS

| | | |
|---|---|---|
| 2,798,848 | Kingdon | July 9, 1957 |
| 2,799,642 | Hurwitz et al. | July 16, 1957 |
| 2,818,605 | Miller | Jan. 7, 1958 |
| 2,820,751 | Saller | Jan. 21, 1958 |
| 2,838,452 | West et al. | June 10, 1958 |
| 2,863,816 | Stacy | Dec. 9, 1958 |
| 2,864,758 | Shackelford | Dec. 16, 1958 |
| 2,879,216 | Hurwitz et al. | Mar. 24, 1959 |
| 2,907,705 | Blainey | Oct. 6, 1959 |
| 2,927,071 | Huey | Mar. 1, 1960 |
| 2,929,707 | Weeks | Mar. 22, 1960 |

FOREIGN PATENTS

| | | |
|---|---|---|
| 752,152 | Great Britain | July 4, 1956 |
| 286,658 | Switzerland | Mar. 2, 1953 |
| 157,657 | Sweden | Jan. 29, 1957 |
| 1,037,605 | Germany | Aug. 28, 1958 |

OTHER REFERENCES

Nucleonics, March 1956, pp. 34–44.
AEC Document BMI–1243, December 18, 1957.
"Journal of the American Nuclear Society," vol. 6, No. 4, October 1959, pp. 255–259.
AEC Document BMI–1244, December 27, 1957.